(12) United States Patent
Hanzlik et al.

(10) Patent No.: US 7,594,262 B2
(45) Date of Patent: Sep. 22, 2009

(54) SYSTEM AND METHOD FOR SECURE GROUP COMMUNICATIONS

(75) Inventors: Robert Otto Hanzlik, Coon Rapids, MN (US); Geoffrey A. Lowe, White Bear Lake, MN (US); Thomas R. Markham, Anoka, MN (US); Lynn Marquette Meredith, Eagan, MN (US)

(73) Assignee: Secure Computing Corporation, San Jose, CA (US)

( * ) Notice: Subject to any disclaimer, the term of this patent is extended or adjusted under 35 U.S.C. 154(b) by 499 days.

(21) Appl. No.: 10/234,223

(22) Filed: Sep. 4, 2002

(65) Prior Publication Data

US 2004/0044891 A1    Mar. 4, 2004

(51) Int. Cl.
*G06F 21/00*  (2006.01)
*H04L 9/00*   (2006.01)

(52) U.S. Cl. .......................... 726/15; 713/171; 726/13; 380/278

(58) Field of Classification Search ........................ None
See application file for complete search history.

(56) References Cited

U.S. PATENT DOCUMENTS

| | | | | |
|---|---|---|---|---|
| 5,748,736 | A * | 5/1998 | Mittra | 713/163 |
| 5,758,069 | A | 5/1998 | Olsen | |
| 5,953,335 | A * | 9/1999 | Erimli et al. | 370/390 |
| 6,049,789 | A | 4/2000 | Frison et al. | |
| 6,055,429 | A | 4/2000 | Lynch | |
| 6,079,020 | A | 6/2000 | Liu | |
| 6,105,027 | A * | 8/2000 | Schneider et al. | 707/9 |
| 6,134,327 | A | 10/2000 | Van Oorschot | |
| 6,167,445 | A | 12/2000 | Gai et al. | |
| 6,173,399 | B1 * | 1/2001 | Gilbrech | 713/153 |
| 6,182,226 | B1 | 1/2001 | Reid et al. | |

(Continued)

FOREIGN PATENT DOCUMENTS

EP     1396979  A2 *   2/2004

(Continued)

OTHER PUBLICATIONS

Harney, H., et al., "Group Secure Association Key Management Protocol", http://www.watersprings.org/pub/id/draft-harney-sparta-gsakmp-sec-02.txt, Internet Engineering Task Force,(Jun. 30, 2000),1-41.

(Continued)

*Primary Examiner*—Christopher A Revak
(74) *Attorney, Agent, or Firm*—Schwegman, Lundberg & Woessner, P.A.

(57) ABSTRACT

A system and method for secure group communications is provided. One embodiment provides a method for implementing a virtual private group network. The method includes creating a virtual private group definition on a policy server, establishing a plurality of secure connections between the policy server and a plurality of group nodes, sending a copy of the virtual private group definition from the policy server to the group nodes, sending a shared traffic encryption key from the policy server to each of the group nodes, and sharing secure communication information among the group nodes using the shared traffic encryption key, wherein each group node is included in the virtual private group definition.

26 Claims, 11 Drawing Sheets

U.S. PATENT DOCUMENTS

| | | | |
|---|---|---|---|
| 6,195,751 B1 | 2/2001 | Caronni et al. | |
| 6,215,872 B1 | 4/2001 | Van Oorschot | |
| 6,223,286 B1* | 4/2001 | Hashimoto | 713/178 |
| 6,226,748 B1* | 5/2001 | Bots et al. | 726/15 |
| 6,226,751 B1* | 5/2001 | Arrow et al. | 726/15 |
| 6,272,538 B1* | 8/2001 | Holden et al. | 709/223 |
| 6,363,154 B1* | 3/2002 | Peyravian et al. | 380/283 |
| 6,546,546 B1 | 4/2003 | Van Doorn | |
| 6,611,863 B1* | 8/2003 | Banginwar | 709/220 |
| 6,636,898 B1* | 10/2003 | Ludovici et al. | 709/250 |
| 6,701,437 B1* | 3/2004 | Hoke et al. | 726/15 |
| 6,718,379 B1* | 4/2004 | Krishna et al. | 709/223 |
| 6,823,462 B1* | 11/2004 | Cheng et al. | 726/15 |
| 6,859,827 B2* | 2/2005 | Banginwar | 709/223 |
| 6,944,183 B1* | 9/2005 | Iyer et al. | 370/466 |
| 7,010,702 B1* | 3/2006 | Bots et al. | 726/13 |
| 7,231,664 B2* | 6/2007 | Markham et al. | 726/15 |
| 7,234,058 B1* | 6/2007 | Baugher et al. | 713/163 |
| 7,234,063 B1* | 6/2007 | Baugher et al. | 713/189 |
| 7,246,232 B2* | 7/2007 | Dutertre | 713/163 |
| 7,308,703 B2* | 12/2007 | Wright et al. | 726/1 |
| 7,353,533 B2* | 4/2008 | Wright et al. | 726/1 |
| 7,366,894 B1* | 4/2008 | Kalimuthu et al. | 713/153 |
| 7,373,660 B1* | 5/2008 | Guichard et al. | 726/15 |
| 7,373,661 B2* | 5/2008 | Smith et al. | 726/15 |
| 7,403,980 B2* | 7/2008 | Stringer-Calvert et al. | 709/220 |
| 7,478,427 B2* | 1/2009 | Mukherjee et al. | 726/15 |
| 2002/0010798 A1* | 1/2002 | Ben-Shaul et al. | 709/247 |
| 2002/0037736 A1 | 3/2002 | Kawaguchi et al. | |
| 2002/0055989 A1* | 5/2002 | Stringer-Calvert et al. | 709/220 |
| 2002/0157024 A1 | 10/2002 | Yokote | |
| 2002/0164025 A1 | 11/2002 | Raiz et al. | |
| 2003/0055989 A1 | 3/2003 | Zamanzadeh et al. | |
| 2003/0126464 A1* | 7/2003 | McDaniel et al. | 713/201 |
| 2003/0204722 A1* | 10/2003 | Schoen et al. | 713/156 |
| 2003/0226013 A1* | 12/2003 | Dutertre | 713/163 |
| 2005/0086300 A1* | 4/2005 | Yeager et al. | 709/204 |
| 2006/0129792 A1* | 6/2006 | Bots et al. | 713/1 |
| 2006/0198368 A1* | 9/2006 | Guichard et al. | 370/389 |
| 2007/0022477 A1* | 1/2007 | Larson | 726/15 |
| 2007/0209071 A1* | 9/2007 | Weis et al. | 726/15 |
| 2008/0072280 A1* | 3/2008 | Tardo et al. | 726/1 |
| 2008/0127327 A1* | 5/2008 | Carrasco | 726/15 |

FOREIGN PATENT DOCUMENTS

| | | |
|---|---|---|
| GB | 2356763 | 5/2001 |
| WO | WO-0069145 A1 | 11/2000 |
| WO | WO-0078004 A3 | 12/2000 |

OTHER PUBLICATIONS

McDaniel, P., et al., "Antigone: A Flexible Framework for Secure Group Communication", http://antigone.eecs.umich.edu/publications/usec99.pdf, (May 23, 1999),1-15.

McDaniel, P., et al., "Flexibly Constructing Secure Groups in Antigone 2.0", *DARPA Information Survivability Conference & Exposition II, 2001. DISCEX '01. Proceedings*, vol. 2, (Jun. 12, 2001),55-67.

Zao, J., et al., "Domain Based Internet Security Policy Management", http://www.ir.bbn.com/ {krash/pubs/zao_discex00.pdf, BBN Technologies Inc.,(Dec. 31, 1999),41-53.

Eli, H., "Secure Virtual Priviate networks: The Future of Data Communications", *International Journal of Network Management, 9*, (1999),213-220.

"U.S. Appl. No. 10/304,469, Notice of Allowance mailed Jan. 8, 2008", NOAR,7 pgs.

"U.S. Appl. No. 10/304,469, Non-Final Office Action mailed Jun. 9, 2008", OARN, 10 pgs.

"Amendment and Response mailed May 21, 2007 in U.S. Appl. No. 10/304,469", 14 pgs.

"Amendment and Response mailed Aug. 22, 2006 in U.S. Appl. No. 10/304,469", 15 pgs.

"U.S. Appl. No. 10/281,843 Final office action mailed Dec. 13, 2006", 11 pgs.

"U.S. Appl. No. 10/281,843 Non Final office action mailed Jun. 28, 2006", 16 pgs.

"U.S. Appl. No. 10/281,843 Notice of allowance mailed Apr. 20, 2007", 7 pgs.

"U.S. Appl. No. 10/281,843 Response filed Sep. 28, 2006 to Non Final office action mailed Jun. 28, 2006", 19 pgs.

"U.S. Appl. No. 10/304,469 response filed Nov. 19, 2007 to Final Office Action mailed Aug. 17, 2007.", 16 pgs.

"Final Office Action Mailed Aug. 17, 2007 in U.S. Appl. No. 10/304,469", FOAR,15 pgs.

"International Search Report mailed Jun. 10, 2002 in PCT Application No. PCT/US01/17153", 3 pgs.

"Non-Final Office Action mailed Nov. 21, 2006 in U.S. Appl. No. 10/304,469", 10 pgs.

"Non-Final Office Action mailed Sep. 29, 2006 in U.S. Appl. No. 10/234,224", 10 pgs.

"Notice of Allowance mailed Jan. 31, 2007 in U.S. Appl. No. 10/234,224", 9 pgs.

"Notice of Allowance mailed Oct. 4, 2007 in U.S. Appl. No. 10/281,843", NOAR,6 pgs.

"Office Action mailed Mar. 7, 2006 in U.S. Appl. No. 10/234,223", 13 pgs.

"Office Action mailed Jun. 13, 2006 in U.S. Appl. No. 10/304,469", 12 pgs.

"Office action response mailed Aug. 7, 2006 in U.S. Appl. No. 10/234,223", 19 pgs.

"Response filed Dec. 29, 2006 to non-final office action mailed Sep. 29, 2006 in U.S. Appl. No. 10/234,224", 15 pgs.

"Supplemental Notice of Allowance mailed Apr. 3, 2007 in U.S. Appl. No. 10/234,224", 3 pgs.

Eli, H., "Secure Virtual Priviate networks: The Future of Data Communications", *International Journal of Network Management, 9*, (1999),213-220.

Mancill, T., "Linux WAN Routers", *Linux Journal; vol. 1998, Issue 50es, Article No. 9*,, Specialized Systems Consultants, Inc., Seattle, WA,(Jun. 1998).

"U.S. Appl. No. 10/304,469, Response filed Oct. 9, 2008 to Non Final Office Action mailed Jun. 9, 2008", 16 pgs.

"U.S. Appl. No. 10/304,469, Notice of Allowance mailed Nov. 13, 2008.", 4 pgs.

\* cited by examiner

|  | VIRTUAL PRIVATE GROUP 1 | VIRTUAL PRIVATE GROUP 2 | VIRTUAL PRIVATE GROUP 3 | VIRTUAL PRIVATE GROUP 4 |
|---|---|---|---|---|
| PRIORITY | 1 | 2 | 3 | 4 |
| NODE 1 | X |  |  | X |
| NODE 2 | X | X |  | X |
| NODE 3 |  | X | X |  |
| NODE 4 | X |  | X | X |

Fig.8A

NODE 1

| VPG TABLE ||
|---|---|
| IP | SA |
| NODE 2 | VPG 1 |
| NODE 4 | VPG 1 |
| NODE 2 | VPG 4 |
| NODE 4 | VPG 4 |

Fig.8B

NODE 2

| VPG TABLE ||
|---|---|
| IP | SA |
| NODE 1 | VPG 1 |
| NODE 4 | VPG 1 |
| NODE 3 | VPG 2 |
| NODE 1 | VPG 4 |
| NODE 4 | VPG 4 |

Fig.8C

NODE 3

| VPG TABLE ||
|---|---|
| IP | SA |
| NODE 2 | VPG 2 |
| NODE 4 | VPG 3 |

Fig.8D

NODE 4

| VPG TABLE ||
|---|---|
| IP | SA |
| NODE 1 | VPG 1 |
| NODE 2 | VPG 1 |
| NODE 3 | VPG 3 |
| NODE 1 | VPG 4 |
| NODE 2 | VPG 4 |

Fig.8E

SYSTEM AND METHOD FOR SECURE GROUP COMMUNICATIONS

RELATED APPLICATION(S)

This application is related to U.S. patent application Ser. No.: 09/578,314, filed May 25, 2000, entitled: DISTRIBUTED FIREWALL SYSTEM AND METHOD, which is now abandoned and; U.S. patent application Ser. No.: 10/234,224, filed Sep. 4, 2002, entitled: SYSTEM AND METHOD FOR TRANSMITTING AND RECEIVING SECURE DATA IN A VIRTUAL PRIVATE GROUP, which is now U.S. Pat. No. 7,231,664.

FIELD OF THE INVENTION

The present invention relates to data security, and more particularly to secure group communications.

BACKGROUND OF THE INVENTION

There are a growing number of Internet users. In addition, there are a growing number of Internet applications that provide an array of services for these users. In such an environment, data security is often a concern. Users continually transmit and receive data over the Internet, and much of this data may be insecure. Unintended recipients may not only have access to the data, but may also obtain information concerning the identity of the sender(s).

The Internet Protocol is an addressing protocol designed to facilitate the routing of traffic in a network. The Internet Protocol is used on many computer networks, including the Internet. It is often desirable to protect information sent with the Internet Protocol using different types of security. Implementing security with the Internet Protocol allows private or sensitive information to be sent over a network with a degree of confidence that the information will not be intercepted, examined, or altered.

Internet Protocol security (IPsec) is a protocol for implementing security for communications on networks using the Internet Protocol through the use of cryptographic key management procedures and protocols. By using IPsec, two endpoints can implement a Virtual Private Network (VPN). Communications between the two endpoints are made secure by IPsec on a packet-by-packet basis. IPsec entities at connection endpoints have access to, and participate in, critical and sensitive operations.

IPsec defines a set of operations for performing authentication and encryption at the packet level by adding protocol headers to each packet. IPsec also implements security associations to identify secure channels between two endpoints for a VPN. A security association is a unidirectional session between the two endpoints. Since a security association is unidirectional, a minimum of two security associations is required for secure, bidirectional communications between the two endpoints when using IPsec in a VPN.

VPN's could be called virtual private links. They provide great point-to-point security, but they do not scale well to support large groups. For example, assume a group of twelve users wishes to create their own private network overlay to provide secure collaboration. These twelve users need a cryptographically isolated network that allows each of the machines to communicate directly with any of the other machines in the group. If the group was using IPsec, they would need to establish $(N*(N-1))/2$ pairwise associations, where N is equal to twelve. IPsec and the associated IKE key management does not (and was never designed to) provide group management. IPsec also does not function well in an environment having Network Address Translation (NAT) devices.

For the reasons stated above, and for other reasons stated below which will become apparent to those skilled in the art upon reading and understanding the present specification, there is a need for the present invention.

SUMMARY OF THE INVENTION

One embodiment provides a method for implementing a virtual private group network. The method includes creating a virtual private group definition on a policy server, establishing a plurality of secure connections between the policy server and a plurality of group nodes, sending a copy of the virtual private group definition from the policy server to the group nodes, sending a shared traffic encryption key from the policy server to each of the group nodes, and sharing secure communication information among the group nodes using the shared traffic encryption key, wherein each group node is included in the virtual private group definition.

Another embodiment provides a method for centralized management of a virtual private group on a policy server. This method includes creating a virtual private group membership list on the policy server, adding a plurality of group members to the membership list, establishing a plurality of secure connections between the policy server and the group members, sending group member data from the policy server to each of the group members, including sending a traffic encryption key list from the policy server to each of the group members, the traffic encryption key list having a plurality of traffic encryption keys, sending secure communication information from one group member to another group member by using one of the traffic encryption keys from the traffic encryption key list, and updating the group member data.

These and other embodiments will be described in the detailed description below.

BRIEF DESCRIPTION OF THE DRAWINGS

FIG. 8A is a data structure diagram illustrating a group security policy data structure according to another embodiment of the present invention.

FIGS. 8B-8E are data structure diagrams illustrating various node security policy data structures created from the group security policy data structure shown in FIG. 8A.

DETAILED DESCRIPTION

Figure 1A:
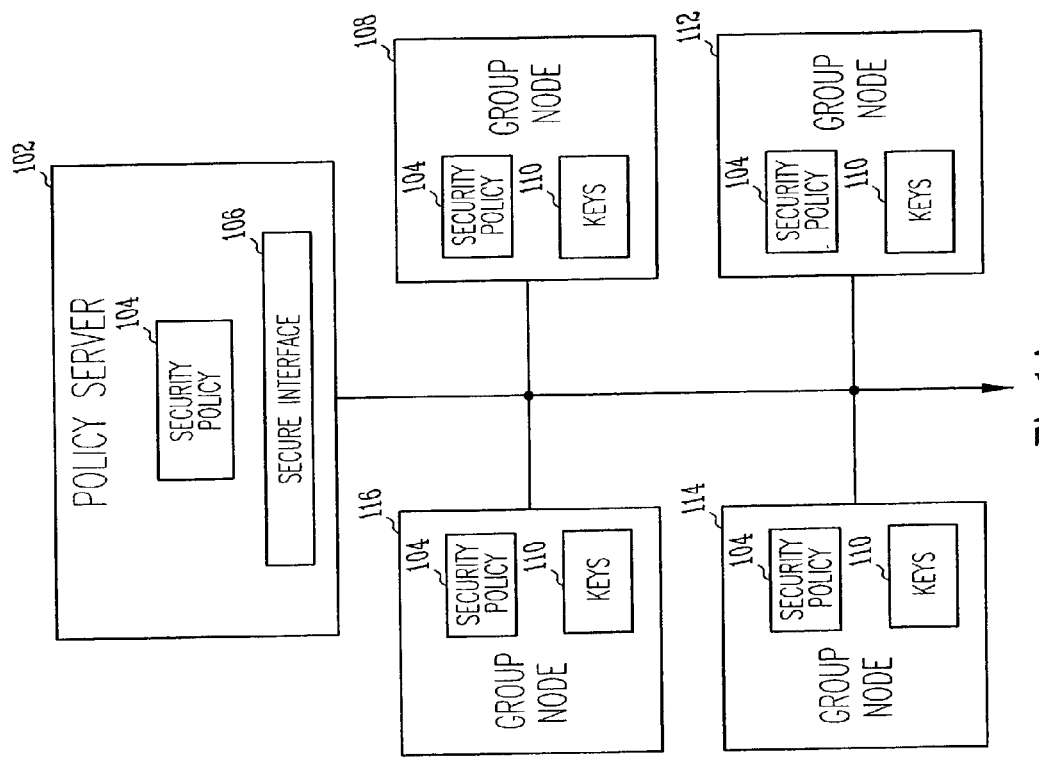
FIG. 1A is a block diagram illustrating a system for secure group communications according to one embodiment of the present invention.

A system and method for secure group communications is described herein. In the following detailed description of the embodiments, reference is made to the accompanying drawings which form a part hereof, and in which are shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Introduction

There are cases where groups of people from different organizations (i.e., administrative domains) work together to collaborate on a problem. Dynamic coalitions created to respond to a crisis are one example of a distributed collaborative environment. These groups need to clearly communicate a lot of information in a short time to respond to the crisis. Development teams from multiple corporations working on a product represent a typical commercial collaboration requirement. The collaboration tools may not provide adequate mechanisms to secure the various types of information exchanged among the group members.

An embodiment of a Virtual Private Group (VPG) communication system allows a group of computing devices to communicate securely, such that all communications between the group members are readable by all of the group members, but not readable by those outside of the group. In the embodiment, a group of two or more computing devices communicate securely over a network. The group of computing devices may, in one embodiment, be part of a wireless network, or, in another embodiment, may be part of a wired network. In a wireless network, the computing devices may include devices such as cellular telephones or personal digital assistants (PDA's).

In the embodiment of the VPG communication system, the system supports peer-to-peer communications within the defined group. The VPG allows every member of a group to communicate with every other member of the group while providing data confidentiality, packet integrity, and source authentication. The structure of the VPG is completely independent of the physical topology of the underlying network. One embodiment of the VPG provides secure communications in a manner transparent to the host operating system and applications. Another embodiment provides the VPG functionality in software on the host. The VPG provides a means of managing keys for the group that is simpler than building (N*(N−1))/2 pairwise connections, and the group management supports members joining and leaving the group. In addition, VPG members can exist behind a classic NAT (Network Address Translation) device.

This embodiment, as well as other embodiments of the invention, are further described below.

Description

FIG. 1A is a block diagram illustrating a system for secure group communications according to one embodiment of the present invention. This embodiment shows centralized management of the secure group communications by a policy server. System 100 includes policy server 102 and group nodes 108, 112, 114, and 116. Policy server 102 and group nodes 108, 112, 114, and 116 are coupled to a communication network. Policy server 102 includes security policy 104 and secure interface 106. Each of the group nodes 108, 112, 114, and 116 are operatively coupled to secure interface 106 of policy server 102 through the communication network. In this fashion, policy server 102 communicates securely with the nodes. Each of the group nodes 108, 112, 114, and 116 include a copy of security policy 104 and a common set of encryption keys 110. In system 100, one of the group nodes is able to securely communicate with another group node by using a copy of security policy 104 and encryption keys 110.

FIG. 1A shows group nodes 108, 112, 114, and 116 each having a copy of security policy 104. This policy has been transmitted from policy server 102. In other embodiments, policy server 102 transmits unique security policies to each of group nodes 108, 112, 114, and 116, wherein each unique security policy is tailored to the specific embodiment and operation of each group node. Each of these unique security policies are generated from security policy 104 maintained on policy server 102.

In one embodiment, one of the group nodes, such as group node 116, includes a host computer. In this embodiment, the host computer has a processor, a memory, and a computer-readable medium. The group node further includes a network interface device coupled to the host computer, the network interface device having a memory, a processor, and a computer-readable medium. In one embodiment, system 100 contains a distributed firewall as described in U.S. patent application Ser. No.: 09/578,314, filed May 25, 2000, entitled: DISTRIBUTED FIREWALL SYSTEM AND METHOD, such that the network interface device is able to detect unauthorized packets. In some embodiments, the network interface device determines whether to further process or discard unauthorized packets by accessing the security policy. The memory of the network interface device includes both volatile and non-volatile memory. In one embodiment, the group node further includes an additional host computer coupled to the network interface device, the additional host computer also having a processor, a memory, and a computer-readable medium.

In one embodiment, the common set of encryption keys includes public encryption keys that are used for asymmetric encryption. Asymmetric encryption is also often referred to in the art as public-key encryption. In this form of encryption, both encryption and decryption are performed using two different keys, one being a private key and the other being a public key. The common set of encryption keys includes the public keys to be used in asymmetric encryption.

In one embodiment, the common set of encryption keys includes encryption keys that are used for symmetric encryption. Symmetric encryption is also known as conventional encryption. In this form of encryption, both encryption and decryption are performed using the same key.

Figure 1B:
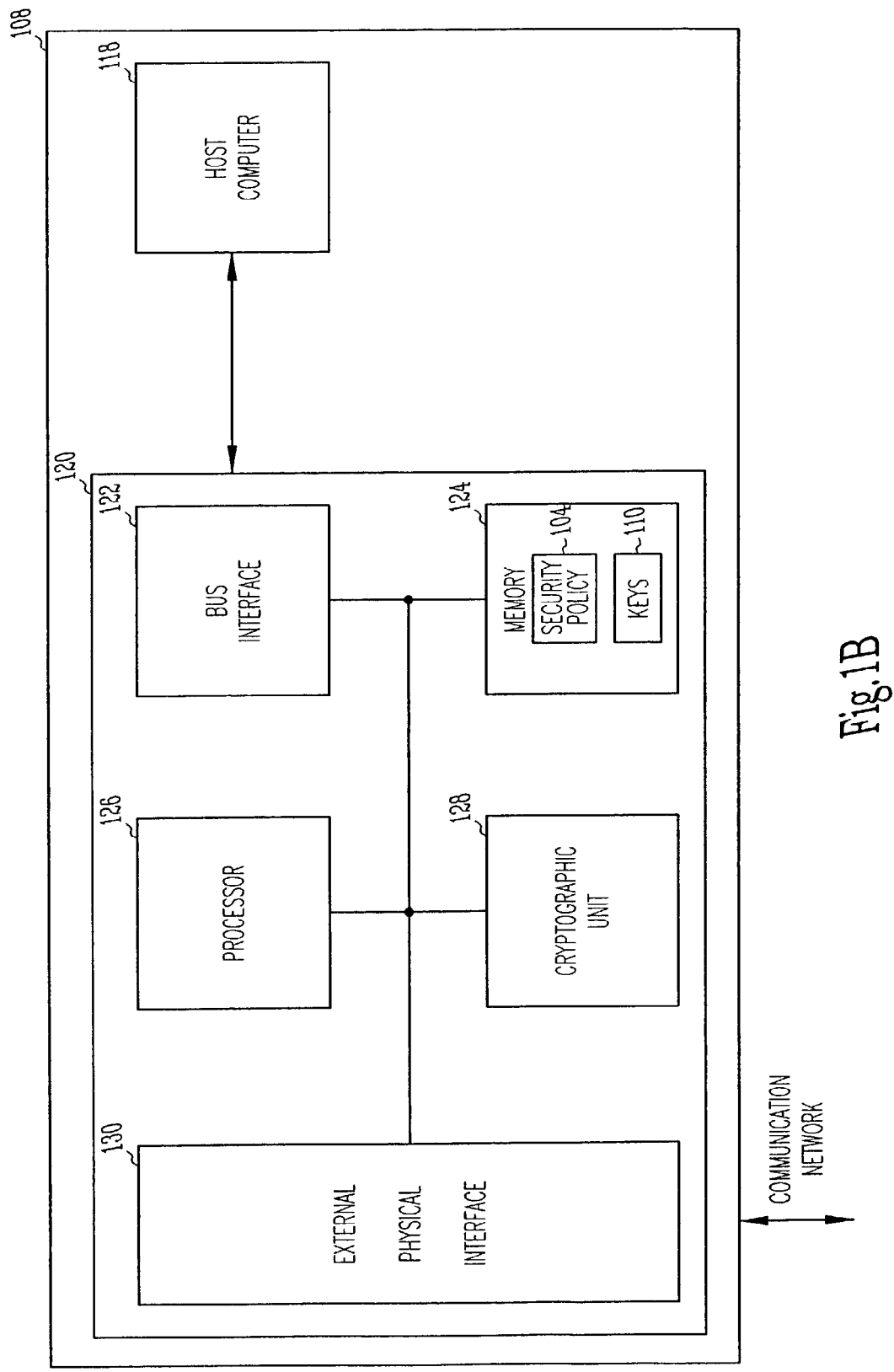
FIG. 1B is a block diagram illustrating an expanded view of one of the group nodes shown in FIG. 1A.

FIG. 1B is a block diagram illustrating an expanded view of one of the group nodes shown in FIG. 1A. FIG. 1B shows, as an example, an expanded view of group node 108. However, in this embodiment of the invention, one or more of any of the group nodes could include the group node embodiment shown in FIG. 1B. Group node 108 is coupled to a communication network. The communication network includes, in different embodiments, an Ethernet, an asynchronous transfer mode (ATM), or a wireless communication network. Group node 108 includes host computer 118 coupled to network interface device 120. Network interface device 120 includes external physical interface 130, cryptographic unit 128, memory 124, bus interface 122, and processor 126. Bus interface 122 includes, in different embodiments, a Peripheral Component Interconnect (PCI), a Universal Serial Bus (USB), a Personal Computer Memory Card International Association (PCMCIA), or other non-PCI bus interfaces. Processor 126 includes, in different embodiments, a reduced instruction set computer (RISC), a complex instruction set computer (CISC), or very long instruction word (VLIW) processor. Each of these elements of network interface device 120 are coupled to an internal communication network. Memory 124 includes both volatile and non-volatile memory. In one embodiment, the non-volatile memory includes a copy of security policy 104 and encryption keys 110. In one embodiment, a copy of security policy 104 is downloaded from policy server 102 at boot-time. Cryptographic unit 128 includes one or more cryptographic algorithms implemented by network interface device 120. These cryptographic algorithms include, in various embodiments, the Data Encryption Standard (DES) algorithm, the triple DES algorithm, the Advanced Encryption Standard (AES), and/or the Rivest-Shamir-Adelman (RSA) algorithm. Processor 126 processes information for cryptographic unit 128 and memory 124 to provide secure group communication functionality. The embodiment shown in FIG. 1B (including its various embodiments) isolates this functionality, however, in network interface device 120, making it more tamper-resistant. The functionality is independent of host computer 118, and the software and/or operating system(s) running on host computer 118, meaning that the algorithms and keys cannot be easily changed, or compromised, by host computer 118.

Figure 1C:
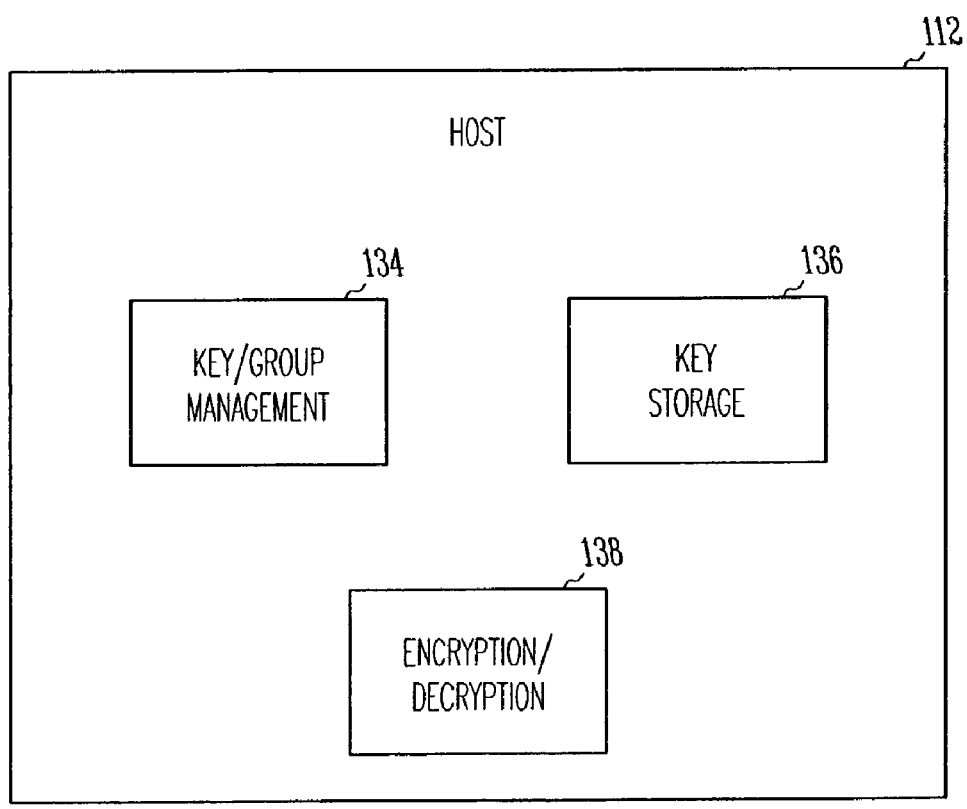
FIG. 1C is a block diagram illustrating an expanded view of another one of the group nodes according to another embodiment of the present invention.

FIG. 1C is a block diagram illustrating an expanded view of another one of the group nodes according to another embodiment of the present invention. FIG. 1C illustrates an alternative embodiment for a group node in system 100. In this embodiment, group node 112 includes a host unit that contains a software implementation. In different embodiments, the host unit may be a laptop, cellular phone, or (PDA). Group node 112 includes software components 134, 136, and 138. Software component 134 includes functionality for key and group management. Component 134 communicates with policy server 102 and receives the group membership information (included in security policy 104) and keys 110 for the group. This component also handles rolling over the session key (used in various embodiments), and adding/removing members from the group. Software component 136 includes functionality for key storage. Component 136 is responsible for storing keys 110. This includes session keys, as well as keys used to communicate with policy server 102. Software component 138 includes functionality for encryption and decryption. Component 138 is responsible for actually encrypting or decrypting packets, and may implement DES, triple DES, or AES algorithms (in various embodiments). There are advantages of the software embodiment shown in FIG. 1C. Group node 112 (which includes the host unit) is capable of supporting small devices, such as cell phones and PDA's. A software embodiment is also less expensive to produce, because it does not require encryption hardware.

Figure 2:
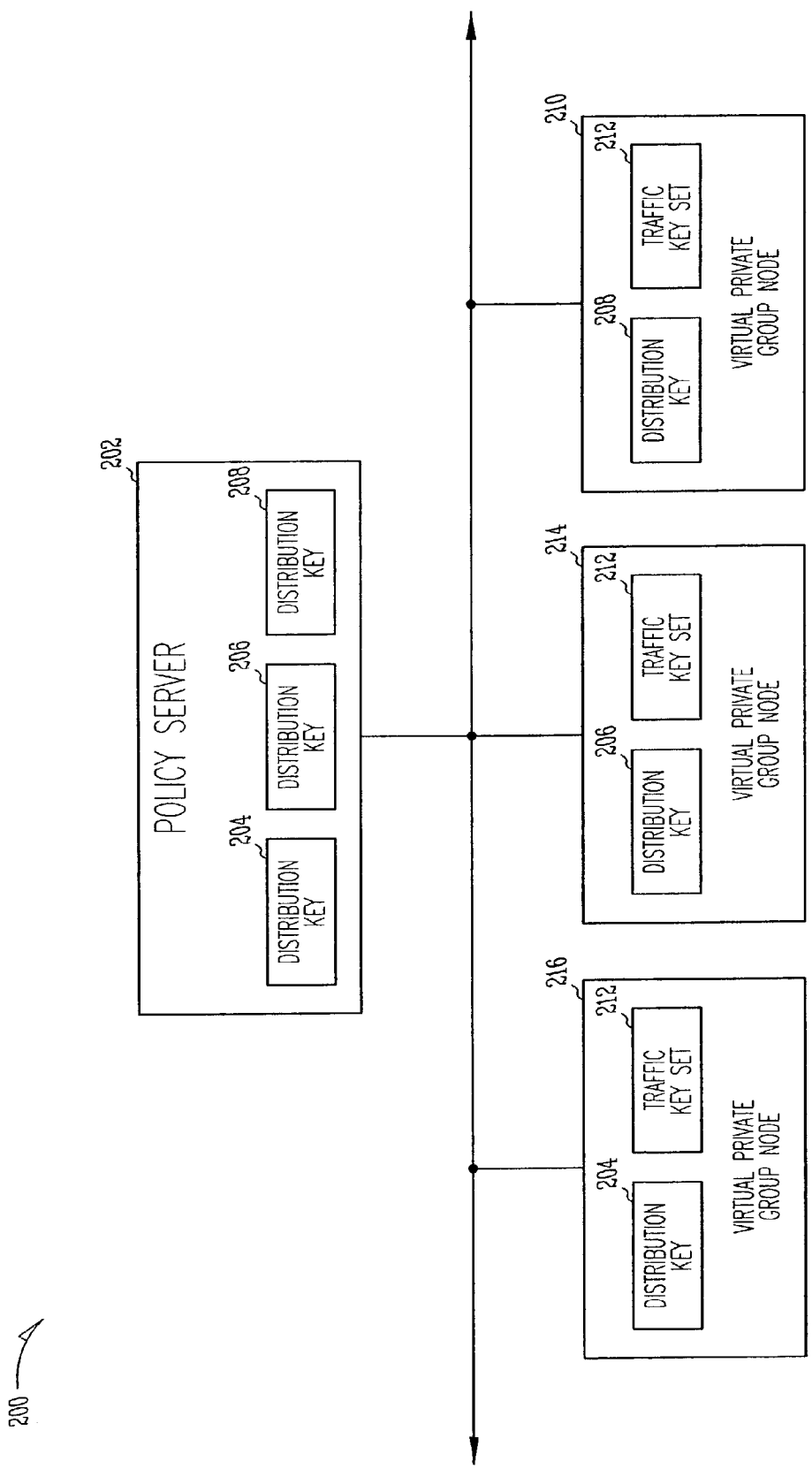
FIG. 2 is a block diagram illustrating a Virtual Private Group (VPG) communication system according to another embodiment of the present invention.

FIG. 2 is a block diagram illustrating a Virtual Private Group (VPG) communication system according to another embodiment of the present invention. In this embodiment, system 200 includes policy server 202 and a VPG having VPG nodes 210, 214, and 216. Policy server 202 and VPG nodes 210, 214, and 216 are coupled to a communication network. Policy server 202 includes key distribution keys 204, 206, and 208. VPG node 210 includes traffic encryption key set 212 and key distribution key 208. VPG node 214 includes traffic encryption key set 212 and key distribution key 206. VPG node 216 includes traffic encryption key set 212 and key distribution key 204. Traffic encryption key set 212 is shared among all of the VPG nodes, and includes one or more traffic encryption keys. The VPG nodes send secure data to the other VPG nodes by using the shared traffic encryption keys.

In one embodiment, each VPG node receives its key distribution key and its shared traffic encryption key from policy server 202. In another embodiment, each VPG node generates the key distribution key and sends it to the policy server.

In one embodiment, policy server 202 further includes a security policy having rules for group node membership, and wherein policy server 202 transmits a copy of the security policy to each of the VPG nodes 210, 214, and 216.

In one embodiment, each VPG node further includes a shared group membership key that is transmitted from policy server 202. At least one of the VPG nodes 210, 214, and 216 includes a host computer coupled to the communication network through a network interface device. For these VPG nodes, the network interface device includes non-volatile memory, wherein the key distribution key, the shared traffic encryption key, and the shared group membership key of these VPG nodes are stored in the non-volatile memory of the network interface device. In one embodiment, the network interface device includes a cryptographic engine.

In one embodiment, policy server 202 is a manager for the VPG nodes within its security domain. It serves as a group membership controller that determines which nodes are members of which group. Policy server 202 may, in certain embodiments, be replicated for load sharing and high availability. Policy server 202 is the communication point between its own domain and other domains. The VPG nodes 210, 214, and 216 are the members of the VPG. In certain embodiments, the VPG nodes include Network Interface Cards (NIC's), software on host computers, or hardware devices outside of host computers. The VPG nodes receive group membership information, and other VPG parameters, from policy server 202. The VPG nodes use this information to encrypt and decrypt traffic.

In this embodiment, a key distribution protocol is used between policy server 202 and the VPG nodes to distribute the membership key and VPG parameters (such as membership lists and sets of traffic encryption keys) to the nodes. A VPG protocol is used between the VPG nodes to allow the nodes to send and receive encrypted traffic. The membership keys are key encryption keys that are shared by all members of a group. These keys are used for securing VPG control messages between VPG nodes. These control messages allow nodes to update VPG parameters in peer nodes without requiring the peer node to always be in contact with policy server 202. The key distribution keys are pairwise keys shared between policy server 202 and each node. Distribution key 204 is used to secure communications between policy server 202 and VPG node 216. Distribution key 206 is used to secure communications between policy server 202 and VPG node 214. And distribution key 208 is used to secure communications between policy server 202 and VPG node 210. The traffic encryption keys 212 are the keys used to encrypt the traffic sent between the VPG nodes. In certain embodiments, this maybe Internet Protocol (IP) unicast, multicast, or broadcast. Traffic encryption keys 212 is a set of one or more keys on each VPG node. System 200 supports a smooth rollover scheme that allows the group to transition from one key within a set to another key without losing the ability to communicate during the transition.

The VPG nodes receive VPG parameters (such as a list of members by IP address, VPG traffic encryption keys, and membership key) from policy server 202. The VPG nodes then apply the membership list to packets being sent and received. If a packet is going to or coming from a member of the list (based upon IP address, in this embodiment), then the VPG traffic encryption key is applied to encrypt or decrypt the packet.

The receiver determines the packet was sent as part of the VPG, and it selects the appropriate VPG traffic encryption key and decrypts the packet. The node may, in some embodiments, apply additional processing to verify the integrity of the packet and apply authorization rules.

The amount of traffic encrypted in any one traffic encryption key is limited to prevent certain classes of cryptanalytic attacks. System 200 accomplishes this by distributing VPG traffic encryption keys 212 from policy server 202 to one or more of the VPG nodes 210, 214, and/or 216. Policy server 202 determines when the group should migrate to the next key in the set. It then sends a trigger message to one or more of the nodes in the VPG telling them to begin using a newer key in the set of VPG traffic encryption keys 212.

The VPG node responds by sending traffic using the newer key. This is indicated to the receiver by incrementing the key index contained in the packet. The receiver looks at the key index, and uses the newer key to decrypt the packet. If the packet decryption is successful, the receiver marks the key just used as the current VPG traffic encryption key. It then uses this key to encrypt all outbound traffic. Policy server 202 distributes sets of traffic encryption keys 212 to the group. Thus, there is no loss of communications as nodes rollover from the older traffic encryption key to the newer key. This scheme is unique in that it allows nodes to gradually learn that they need to shift to the new key instead of forcing every node to switch the new key at the same time. This accommodates nodes that may have been "off the network" for some reason (e.g. a laptop is unplugged).

Occasionally a node (that is still a member of the group) will not communicate with policy server 202 for such a long period of time that other members of the group have moved to a new key set while the "out of touch" node is still using the old VPG traffic encryption key set. When this occurs, the more "up to date" nodes will have discarded old VPG traffic encryption keys but they will still have the same membership key. System 200 contains a unique mechanism for bringing the nodes up to the same version of the key set. The example below illustrates the operation.

If VPG node 210 receives a packet from fellow VPG node 214 that it cannot decrypt, it returns an error message to sending VPG node 214. This error message contains the current key set being used by node 210 along with version information. When node 214 receives this error message, it decrypts it with the membership key and recovers the key set being used by the peer, node 210. If the version information indicates that the key set is newer than what node 214 is using, then node 214 replaces its VPG traffic encryption keys with the newer set. If however, the node 214 actually has a newer version, then it sends its current key set to node 210 along with version information. Thus, whichever node is out of date is updated and the two nodes can communicate again. This update can take place even if neither node is able to communicate with policy server 202.

When membership in the group changes, policy server 202 distributes a new membership key, a new set of VPG traffic encryption keys 212, and a new membership list to each node. This ensures that an ejected member of the group is not able to trick other nodes into giving it the current key set.

In some embodiments, members of the VPG may not be under the direct control of a single policy server. When this occurs, the policy servers responsible for the respective nodes communicate with each other via a policy server-to-policy server protocol to negotiate group membership, keys, and other VPG parameters.

Figure 3A:
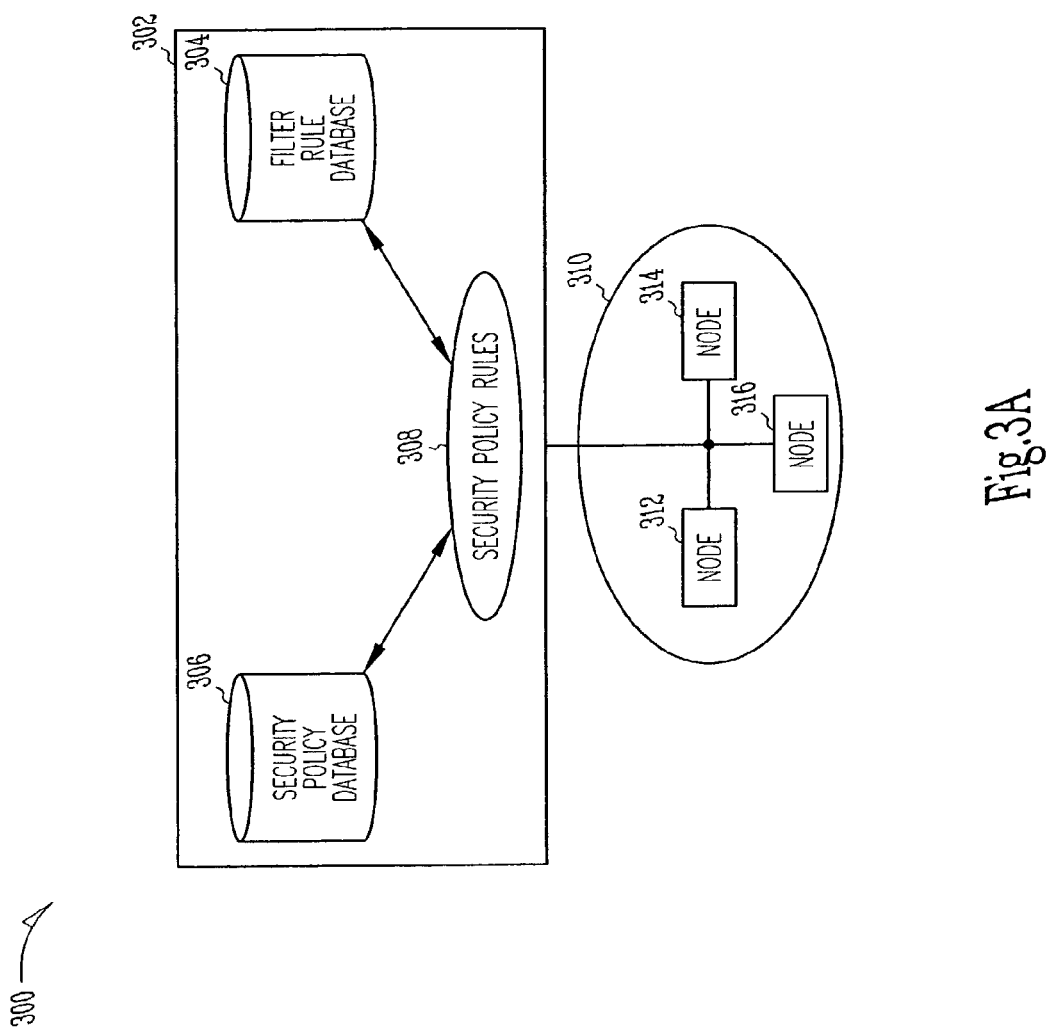
FIG. 3A is a block diagram illustrating a system for secure communications according to another embodiment of the present invention.

FIG. 3A is a block diagram illustrating a system for secure communications according to another embodiment of the present invention. System 300 includes a network, policy server system 302 coupled to the network, and group 310 coupled to the network. Policy server system 302 includes security policy database 306 and filter rule database 304. Policy server system 302 uses security policy database 306 and filter rule database 304 to create security policy rules 308. Group 310 includes node 312, node 314, and node 316, each of which is coupled to the network. Policy server system 302 transmits security policy rules 308 to the nodes of group 310. Nodes 312, 314, and 316 of group 310 use a common set of encryption keys, and the nodes communicate securely with one another by using security policy rules 308 and the common set of encryption keys to encrypt and decrypt data that is transmitted across the network.

In one embodiment, nodes 312, 314, and 316 of group 310 each have a packet filter to detect unauthorized packets in the data as a function of security policy rules 308. In certain embodiments, system 300 provides an integrated VPG and packet filtering policy framework. For example, if a node is a member of a VPG, a first filter policy is used for detecting unauthorized packets. If the node is not a member of the VPG, then a second filter policy is used.

Figure 3B:
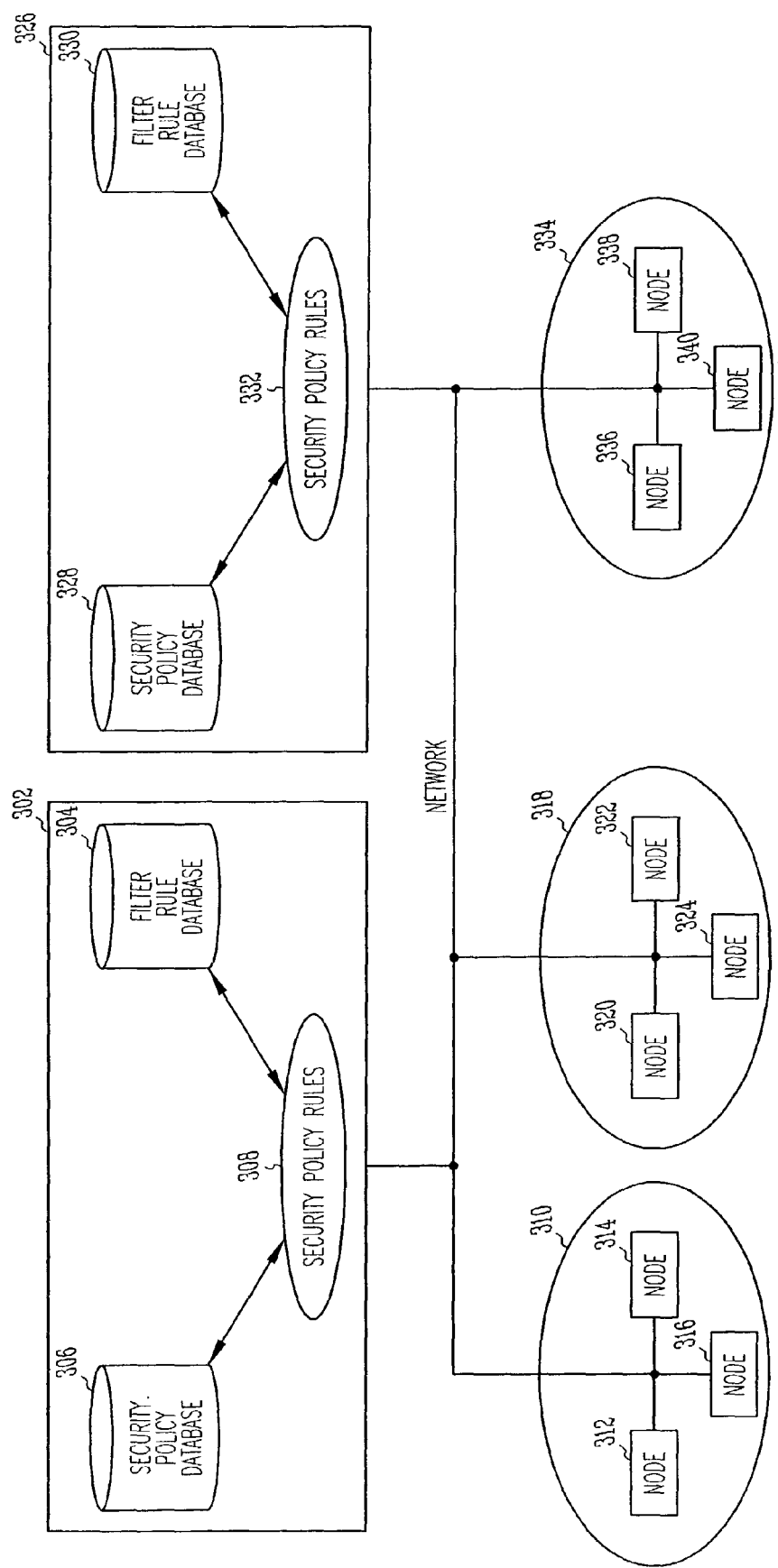
FIG. 3B is a block diagram illustrating a system for secure communications having multiple policy servers according to another embodiment of the present invention.

FIG. 3B is a block diagram illustrating a system for secure communications having multiple policy servers according to another embodiment of the present invention. This embodiment provides capability for interdomain VPG's. In this embodiment, policy server system 302 is further coupled to group 318 via the network. Group 318 includes node 320, node 322, and node 324, each of which is coupled to the network. Policy server system 302 transmits security policy rules 308 to nodes 320, 322, and 324 of group 318. The nodes of group 318 use a common set of encryption keys for group 318, and the nodes communicate securely with one another by using security policy rules 308 and the common set of encryption keys for group 318 to encrypt and decrypt data that is transmitted across the network.

The system shown in FIG. 3B further includes policy server system 326 coupled to the network, and group 334 also coupled to the network. Policy server system 326 includes security policy database 328 and filter rule database 330. Policy server system 326 uses security policy database 328 and filter rule database 330 to create security policy rules 332. Group 334 includes nodes 336, 338, and 340, which are each coupled to the network. Policy server system 326 transmits security policy rules 332 to nodes 336, 338, and 340 of group 334. Nodes 336, 338, and 340 of group 334 use a common set of encryption keys, and communicate securely with one another by using security policy rules 332 and the common set of encryption keys to encrypt and decrypt data that is transmitted across the network.

In this embodiment, policy server system 326 and policy server system 302 are coupled via the network, and have the capability to implement interdomain VPG's (wherein each policy server system manages its security domain). Policy server system 302 manages group 310 and group 318, and policy server system manages group 334. Policy server system 302 is able to communicate with policy server system 326 via a policy server-to-policy server protocol, to manage operations between group 310, 318, and 334. In the embodiment shown in FIG. 3B, the nodes are each shown to be a member of a distinct group. In other embodiments, however, an individual node may be a member of two or more separate VPG's that are managed by one or more policy server systems.

Figure 4:
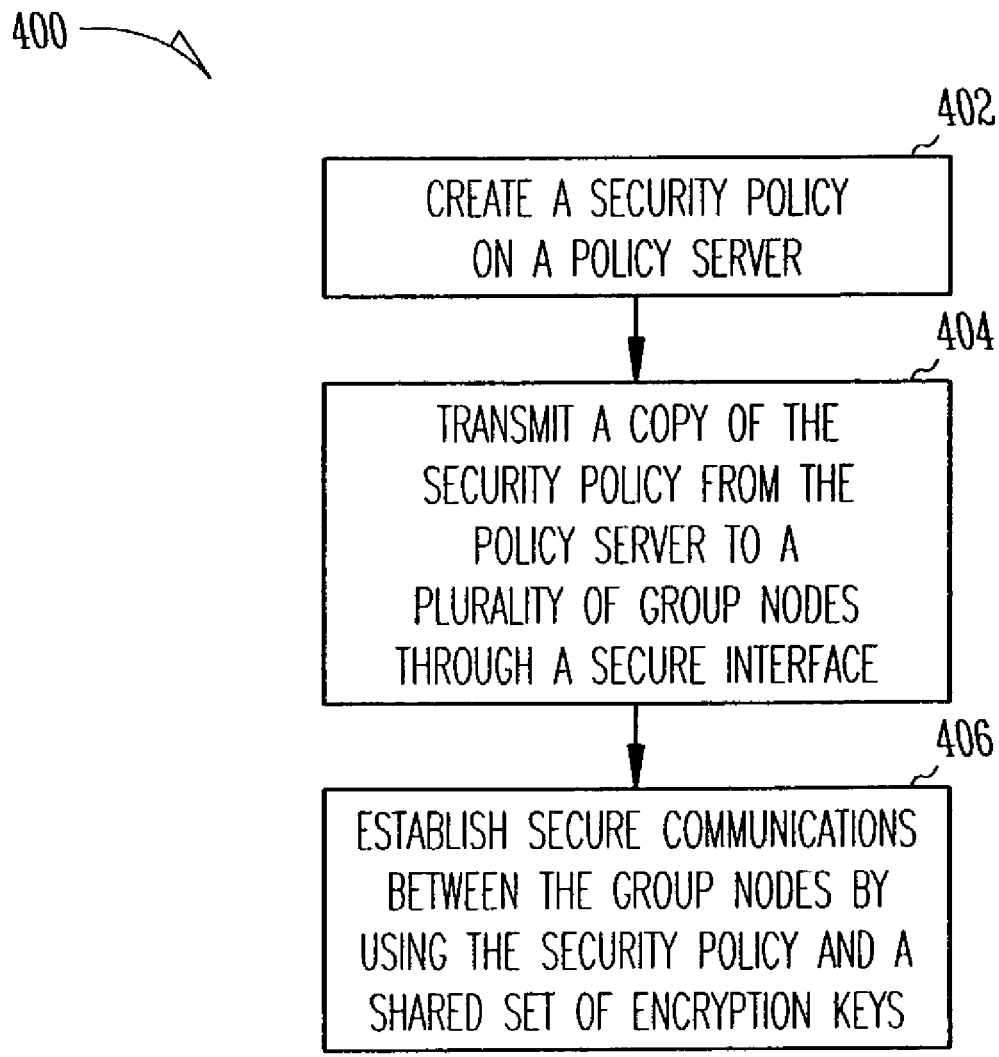
FIG. 4 is a flow diagram illustrating a method for secure group communications according to another embodiment of the present invention.

FIG. 4 is a flow diagram illustrating a method for secure group communications according to another embodiment of the present invention. In this embodiment, flow diagram 400 includes creating a security policy on a policy server at 402. At 404, flow diagram 400 includes transmitting a copy of the security policy from the policy server to a number of group nodes through a secure interface. At 406, flow diagram includes establishing a secure communications between the group nodes by using the security policy and a shared set of encryption keys. In one embodiment, the shared set of encryption keys includes a list of shared traffic encryption keys. A group node uses one of the shared traffic encryption keys and the security policy to establish secure communications with another group node.

Figure 5:
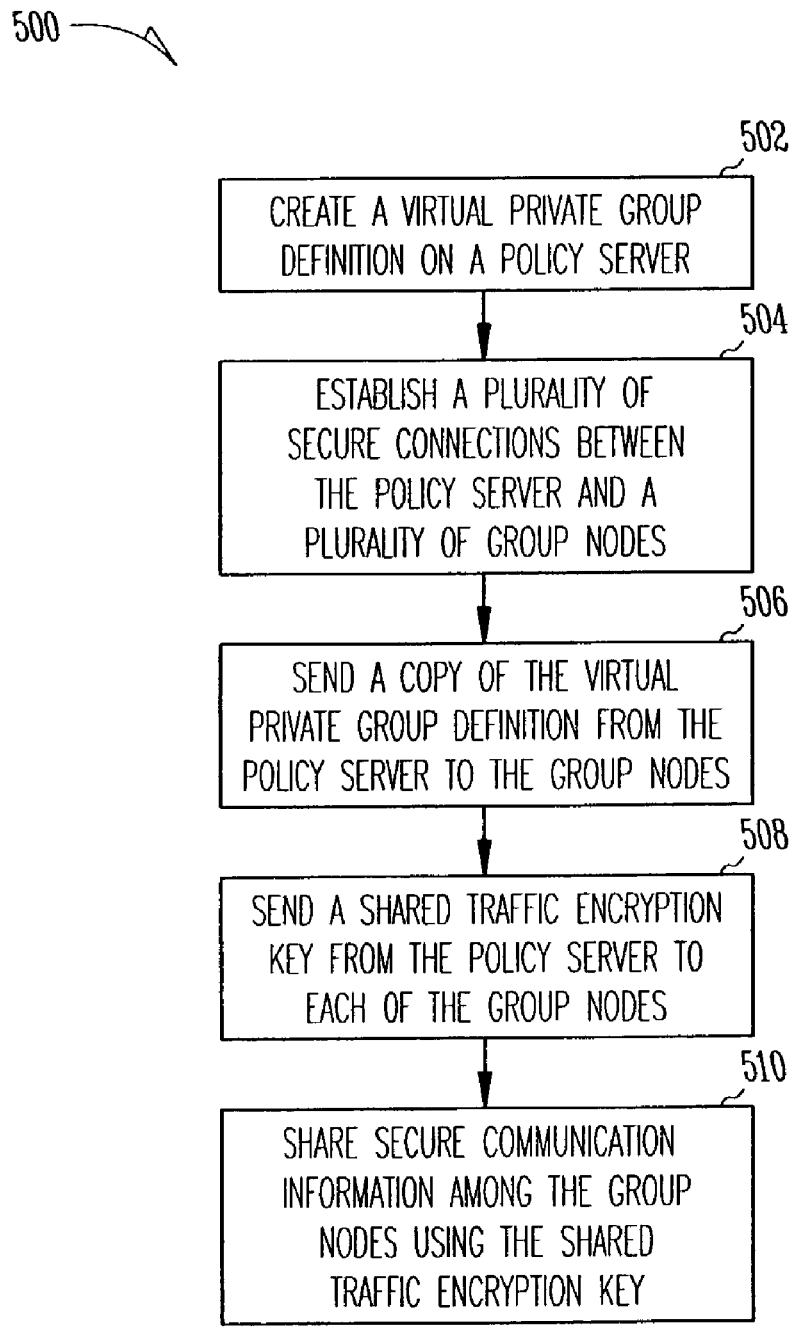
FIG. 5 is a flow diagram illustrating a method for implementing a VPG network according to another embodiment of the present invention.

FIG. 5 is a flow diagram illustrating a method for implementing a VPG network according to another embodiment of the present invention. Flow diagram 500 includes creating a VPG definition on a policy server at 502. At 504, flow diagram 500 includes establishing a number of secure connections between the policy server and a number of group nodes. At 506, flow diagram 500 includes sending a copy of the VPG definition from the policy server to the group nodes. At 508, flow diagram 500 includes sending a shared traffic encryption key from the policy server to each of the group nodes. At 510, flow diagram 500 includes sharing secure communication information among the group nodes using the shared traffic encryption key. Each group node is included in the VPG definition.

In one embodiment, the sharing of secure communication information includes detecting unauthorized communication information using a packet filter.

In one embodiment, the sharing of secure communication information includes using a shared group membership key. In this embodiment, each of the group nodes use the shared group membership key to achieve secure group communications.

Figure 6:
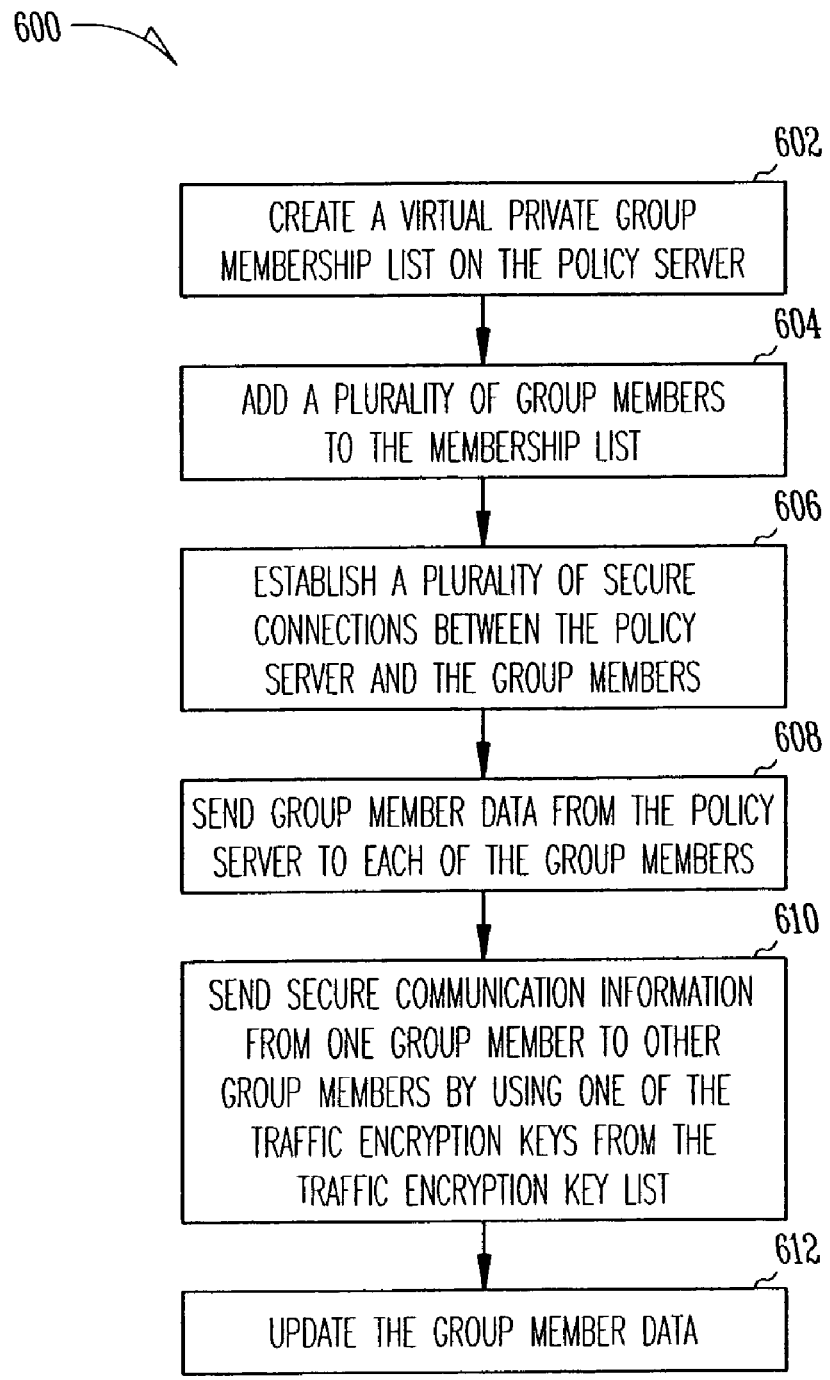
FIG. 6 is a flow diagram illustrating a method for centralized management of a VPG on a policy server according to another embodiment of the present invention.

FIG. 6 is a flow diagram illustrating a method for centralized management of a VPG on a policy server according to another embodiment of the present invention. In this embodiment, flow diagram 600 includes creating a VPG membership list on the policy server at 602. At 604, flow diagram 600 includes adding a number of group members to the membership list. At 606, flow diagram 600 includes establishing a number of secure connections between the policy server and the group members. At 608, flow diagram 600 includes sending group member data from the policy server to each of the group members, including sending a traffic encryption key list from the policy server to each of the group members. The traffic encryption key list has a number of traffic encryption keys. At 610, flow diagram 600 includes sending secure communication information from one group member to another group member by using one of the traffic encryption keys from the traffic encryption key list. At 612, flow diagram 600 includes updating the group member data.

In one embodiment, the sending of group member data includes sending a copy of the membership list from the policy server to each of the group members.

In one embodiment, the sending of group member data includes sending a membership key from the policy server to each of the group members.

In one embodiment, the updating of the group member data includes sending a secure message from the policy server to one group member to indicate that all group members must use a new traffic encryption key from the traffic encryption key list, and sending secure communication information from the one group member to another group member by using the new traffic encryption key.

In one embodiment, the updating of the group member data includes changing the number of group members in the membership list on the policy server, sending an updated copy of the membership list from the policy server to each of the group members, sending a new membership key from the policy server to each of the group members, and sending a new traffic encryption key list from the policy server to each of the group members. In one embodiment, the changing of the number of group members in the membership list includes adding a new group member to the membership list. In one embodiment, the changing of the number of group members in the membership list includes removing one of the group members from the membership list. In this embodiment, a member that has been removed from the group will not have access to the new membership key or new traffic encryption key list, thereby protecting the security of the VPG.

In one embodiment, the updating of the group member data includes sending a secure message from the policy server to all of the group members to indicate that they must use a new traffic encryption key from the traffic encryption key list, and sending secure communication information from one group member to another group member by using the new traffic encryption key.

Figure 7:
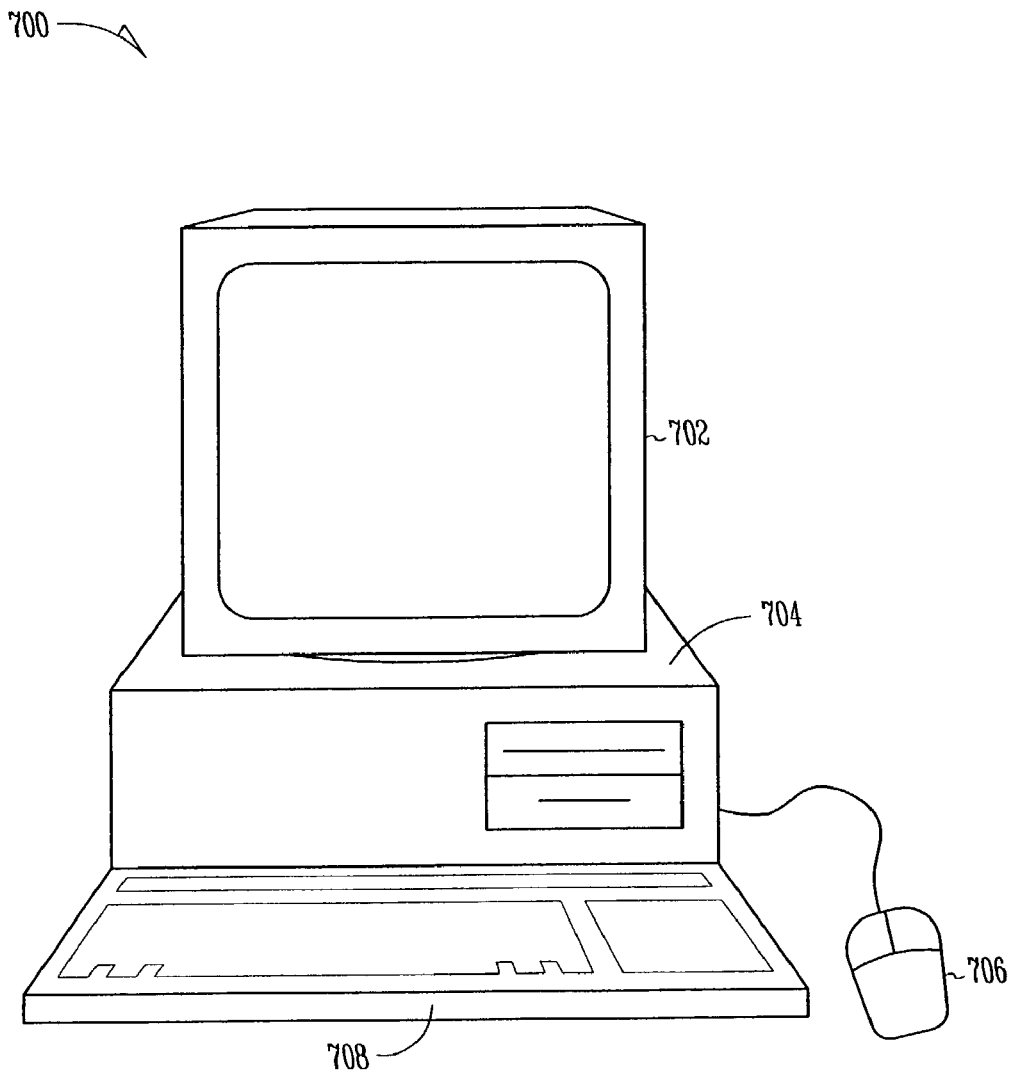
FIG. 7 is a system diagram illustrating a VPG node having a computer-readable medium according to another embodiment of the present invention.

FIG. 7 is a system diagram illustrating a VPG node having a computer-readable medium according to another embodiment of the present invention. FIG. 7 shows just one example of a VPG node. Node 700 includes display 702, processing unit 704, pointing device 706, and keyboard 708. Processing unit 704 is operatively coupled to display 702, pointing device 706, and keyboard 708. Processing unit 704 includes a processor, a memory, and one or more storage devices. The memory, in certain embodiments, includes both random-access memory (RAM) and read-only memory (ROM). The one or more storage devices, in certain embodiments, include a hard disk drive, a floppy disk drive, an optical disk drive, and/or a tape cartridge drive. Therefore, processing unit 704 includes one or more computer-readable media. In one embodiment, processing unit 704 includes a computer-readable medium having computer-executable instructions stored thereon, the computer-executable instructions to be executed by the processor from the memory to perform methods of operation of various embodiments of the present invention. In one embodiment, processing unit 704 includes a computer-readable medium having a data structure stored thereon.

FIG. 8A is a data structure diagram illustrating a group security policy data structure according to another embodiment of the present invention. In this embodiment, group security policy data structure 800 is stored on a computer-readable medium. Group security policy data structure 800 is part of the overall security policy that is implemented by a policy server.

In this embodiment, group security policy data structure 800 includes a number of node entries, a number of priority identifiers, and a number of VPG definitions, wherein each VPG definition includes a number of the node entries, and wherein each VPG definition includes one of the priority identifiers. Group security policy data structure 800 includes node entry 812 ("node 1"), node entry 814 ("node 2"), node entry 816 ("node 3"), and node entry 818 ("node 4"). Priority identifiers 810 include "priority 1," "priority 2," "priority 3," and "priority 4." VPG definition 802 ("VPG 1") includes "priority 1," and also includes "node 1," "node 2," and "node 4." VPG definition 804 ("VPG 2") includes "priority 2," and also includes "node 2" and "node 3." VPG definition 806 ("VPG 3") includes "priority 3," and also includes "node 3" and "node 4." VPG definition 808 ("VPG 4") includes "priority 4," and also includes "node 1," "node 2," and "node 4." Group security policy data structure 800 illustrates how an individual node can be a member of multiple VPG's. "Node 1" is a member of "VPG 1" and "VPG 4." "Node 2" is a member of "VPG 1," "VPG 2," and "VPG 4." "Node 3" is a member of "VPG 2" and "VPG 3." And, "node 4" is a member of "VPG 1," "VPG 3," and "VPG 4." By implementing priority identifiers 810, group security policy data structure 800 also illustrates how, in one embodiment, a policy server can determine the most appropriate VPG for a given set of nodes. VPG's of "priority 1" have the highest priority in this portion of the security policy. Thus, if the policy server is attempting to identify the most appropriate VPG for "node 1" and "node 2," it would identify "VPG 1." "VPG 1" includes both "node 1" and "node 2," and it has "priority 1." Although "VPG 4" also includes both "node 1" and "node 2," "VPG 4" has only "priority 4," which is a lower priority than the "priority 1" of "VPG 1." Similarly, if the policy server is attempting to identify the most appropriate VPG for "node 1," "node 2," and "node 4," it would identify "VPG 1" rather than "VPG 4." By using group security policy data structure 800, the policy server can manage the VPG's, and group membership to the VPG's.

In some embodiments, node entry 812 of group security policy data structure 800 includes a user identification. In other embodiments, node entry 814 includes a machine identification. In other embodiments, node entry 816 includes one or more Internet Protocol (IP) addresses. In other embodiments, node entry 818 includes an IP subnet with an exclusion identifier. In such embodiments, node entry 818 is used to securely transmit data to an entire IP subnet, while excluding one or more of the addresses. For example, in one embodiment, node entry 818 could include an IP subnet of "172.16.1.*" and an exclusion identifier of "172.16.1.44." In this instance, node entry 818 includes the IP subnet of "172.16.1.*" except for the specific address of "172.16.1.44." Thus, the specific address of "172.16.1.44" is excluded from any of the VPG's of which node entry 818 is a member.

FIGS. 8B-8E are data structure diagrams illustrating various node security policy data structures created from the group security policy data structure shown in FIG. 8A. FIG. 8B shows node security policy data structure 820 for "node 1." In certain embodiments, a policy server creates individual node security policy data structure 820 from group security policy data structure 800, and transmits structure 820 to "node 1." Structure 820 is particular to "node 1," and includes a VPG Table that has information about each of the VPG's to which "node 1" belongs. The information includes one or more entries having Internet Protocol (IP) address and security association (SA) data for members of the VPG's. "Node 1" is a member of "VPG 1" and "VPG 4", and therefore the VPG Table in structure 820 contains IP address and SA information for the other nodes in these VPG's. "Node 2" and "node 4" are listed members of "VPG 1," and "node 2" and "node 4" are also listed members of "VPG 4." In certain embodiments, VPG priority is established in a top-down approach. If "node 1" wants to transmit secure information to "node 2" and "node 4," it will look in its VPG Table, to find the highest-priority VPG that includes these nodes. As shown in FIG. 8B, "VPG 1" is the highest-priority VPG (when searched in a top-down fashion) that includes both "node 2" and "node 4." Other embodiments may implement a bottom-up search priority implementation. In these embodiments, "VPG 4" would be the highest priority VPG that includes both "node 2" and "node 4."

FIGS. 8C-8E show similar node security policy data structures 822, 824, and 826 for "node 2," "node 3," and "node 4," respectively. In certain embodiments, a policy server creates these individual node security policy data structures 822, 824, and 826 from group security policy data structure 800, and transmits these structures to "node 2," "node 3," and "node 4," respectively.

Methods of Use

There are a number of methods of use for various embodiments of a VPG system and protocol. The methods of use described below are a non-exclusive set of examples that illustrate the power and flexibility of these embodiments of a VPG.

In one embodiment, a VPG system is used to protect a single organization or office. In this embodiment, all hosts within an organization at a particular location would be placed in a single VPG. All traffic among these hosts would be encrypted, and no foreign host could plug into the network and be able to snoop data or transmit data on the organization's network. Further, by making the internal network side of the organization's perimeter firewall a member of the VPG, no host could get to an external network without going through the firewall. For example, to get to the Internet, a host on the internal network must route its packets through the firewall that would decrypt them, apply filtering, and then send plaintext packets to the external network. Since there is no restriction on the number of VPG's that a host can be a member of, it is possible to subdivide the organization into separate VPG's. Hosts in an accounting department could be cryptographically separated from the engineering department by placing them in separate VPG's. Hosts that require access to both networks could be placed in both VPG's. All of this would be transparent to the users and would be centrally managed by a policy server. In one embodiment, a VPG system can also be used for remote offices in an organizational infrastructure.

In one embodiment, a VPG system is used to allow a home user to telecommute. In this embodiment, a telecommuter may have a Digital Subscriber Line (DSL) connection or cable modem with a NAT device sifting between the home computer and the Internet service provider. A policy server must be visible to the home computer, so that when it boots, it can obtain a VPG policy. In addition to sending a VPG table to the home computer, the policy server also updates the VPG tables on the other members of the VPG.

In one embodiment, a VPG system can be used for roaming users. Most organizations have users with laptops that wish to use the organization's computer resources from various remote sites. These machines can pop up anywhere and will have unpredictable IP addresses, and will frequently be behind NAT devices whose external IP addresses are not known in advance. In one embodiment, the NAT device is not initially part of the VPG. When the roaming user boots his or her node behind the NAT device and contacts its policy server to obtain a VPG table, the policy server must authenticate the node, and take note of the IP addresses being used for NAT. Once the node's identity is established, the policy server updates the VPG tables of the other members of the VPG to include an entry for the NAT device.

In one embodiment, a VPG system is used in wireless Local Area Network (LAN) systems. Multiple group members can communicate securely over the wireless LAN.

In one embodiment, a VPG system is used for managing a secure videoconferencing environment on the Internet or other network. Groups can be dynamically formed for collaboration. Group members can be dynamically added and removed, and all traffic is encrypted between specified IP addresses in the group.

Although specific embodiments have been illustrated and described herein, it will be appreciated by those of ordinary skill in the art that any arrangement that is calculated to achieve the same purpose maybe substituted for the specific embodiment shown. This application is intended to cover any adaptations or variations of the described embodiments of the present invention.

What is claimed is:

1. A system for secure group communications, the system comprising:
   a communication network;
   a policy server coupled to the communication network, the policy server having
      a secure interface,
      a first security policy, and
      a second security policy; and
   a plurality of nodes operatively coupled to each other through the communication network, wherein the plurality of nodes includes a plurality of group nodes operatively coupled to the secure interface of the policy server through the communication network, wherein each of the plurality of group nodes includes a host computer connected to a network interface device over a bus interface, wherein:
      the host computer includes a memory; and
      the network interface device includes a processor, a cryptographic unit, a packet filter, and a memory separate from the host computer memory,
   wherein each of the group nodes is assigned to one or more virtual private groups,
   wherein the first security policy includes group membership information for each of the plurality of group nodes,
   wherein the network interface devices receive a copy of the first security policy, a copy of the second security policy, and a set of encryption keys from the policy server and store the the security policies and the set of encryption keys into memory within each network interface device,
   wherein each network interface device is configured to use the first security policy, the group membership information and the encryption keys associated with the group membership information to receive information from the host computer and to securely communicate with a network interface device on another group node, and
   wherein the network interface device detects and blocks unauthorized packets sent to the group node using the packet filter as a function of the first security policy when the packets come from a group node and as a function of the second security policy when the packets come from a node that is not part of a virtual private group.

2. The system of claim 1, wherein one host computer further includes a computer-readable medium.

3. The system of claim 1, wherein the memory of the network interface device includes both volatile and non-volatile memory.

4. The system of claim 1, wherein one group node further includes an additional host computer coupled to the network interface device, the additional host computer having a processor, a memory, and a computer-readable medium.

5. The system of claim 1, wherein the common set of encryption keys includes public encryption keys that are used for asymmetric encryption.

6. A virtual private group communication system, comprising:
   a communication network;
   a plurality of nodes operatively coupled to each other through the communication network;
   a policy server coupled to the communication network, the policy server having a plurality of key distribution keys; and
   one or more virtual private groups, wherein each virtual private group includes a plurality of the nodes as virtual private group nodes that are operatively coupled to the policy server through the communication network,
   wherein:
      each virtual private group node includes a host computer connected to a network interface device over a bus interface,
      the host computer includes a memory,
      the network interface device includes a processor, a cryptographic unit, a packet filter, and a memory separate from the host computer memory,
      each virtual private group node has virtual private group membership information, a key distribution key, and a shared traffic encryption key stored in the memory of the network interface device,
      the virtual private group membership information details the group nodes that are members of the virtual private group,
      the packet filter operates to block packets as a function of a first security policy when the operating as a virtual private group node and as a function of a second security policy when not operating as a virtual private group node, and
      the virtual private group nodes are adapted to send secure data to the other virtual private group nodes within a particular virtual private group by using the shared traffic encryption keys associated with the virtual private group.

7. The virtual private group communication system of claim 6, wherein each virtual private group node receives its key distribution key and its shared traffic encryption key from the policy server.

8. The virtual private group communication system of claim 6, wherein the policy server further includes a security policy having rules for group node membership, and wherein the policy server transmits a copy of the security policy to each of the virtual private group nodes.

9. The virtual private group communication system of claim 6, wherein each virtual private group node further includes a shared group membership key that is transmitted from the policy server.

10. The virtual private group communication system of claim 6, wherein the memory of the network interface device includes non-volatile memory, and wherein the key distribution key, the shared traffic encryption key, and the shared group membership key of the virtual private group node are stored in the non-volatile memory of the network interface device.

11. A system for secure communications, the system comprising:
- a network;
- a policy server system coupled to the network, the policy server system having a security policy database and a filter rule database; and
- a plurality of nodes, wherein each node is coupled to the network through a network interface device and wherein each node includes a host computer connected to the network interface device over a bus interface, wherein the host computer includes a memory and wherein the network interface device includes a processor, a cryptographic unit and a memory separate from the host computer memory and wherein each network interface device includes a packet filter,
- wherein the policy server system is configured to use the security policy database and the filter rule database to create security policy rules assigning two or more of the nodes to a virtual private group,
- wherein the policy server system is configured to transmit the security policy rules to the two or more nodes that are members of the virtual private group,
- wherein the nodes of the virtual private group are configured to use a common set of encryption keys stored in the memory of the network interface device and to communicate securely with one another by using the security policy rules and the common set of encryption keys to encrypt or decrypt data that is transmitted across the network to other members of the virtual private group, and
- wherein the nodes of the virtual private group use the packet filter in the network interface device to detect unauthorized packets as a function of a first set of security policy rules when communicating with another virtual private group member and as a function of a second set of security policy rules when communicating with a node that is not a virtual private group member.

12. The system of claim 11, wherein the policy server system creates unique security policy rules for each node in the group, and wherein the unique security policy rules contain one or more entries for members of the group.

13. The system of claim 11, wherein two or more nodes of the plurality of nodes are assigned to a second virtual private group,
- wherein the policy server system transmits the security policy rules to the nodes assigned to the second virtual private group,
- wherein the nodes of the second virtual private group use a second common set of encryption keys stored in the memory of their network interface devices, and
- wherein the nodes of the second virtual private group communicate securely with one another by using the security policy rules and the second common set of encryption keys to encrypt and decrypt data that is transmitted across the network.

14. The system of claim 13, wherein the system further includes:
- a second policy server system coupled to the network, the second policy server system having a security policy database and a filter rule database; and
- wherein two or more nodes of the plurality of nodes are assigned to a third virtual private group,
- wherein the second policy server system uses the security policy database and the filter rule database to create security policy rules associated with the third virtual private group,
- wherein the second policy server system transmits the security policy rules associated with the third virtual private group to the nodes assigned to the third virtual private group,
- wherein the nodes of the third virtual private group use a common set of encryption keys, and
- wherein the nodes of the third virtual private group communicate securely with one another by using the security policy rules and the common set of encryption keys to encrypt and decrypt data that is transmitted across the network.

15. A system for secure communications between members of a virtual private group, the system comprising:
- a communications network;
- policy management means, coupled to the communications network, for managing the virtual private group and for managing a set of node security keys associated with the virtual private group and for providing security policy rules;
- group communication means, coupled to the communication network, for storing the set of node security keys and for encrypting data between members of the virtual private group by using the node security keys, wherein:
  - the group communication means includes a host computer connected to the network interface device over a bus interface, wherein the host computer includes a memory,
  - the network interface device includes a processor, a cryptographic unit, a packet filter, and a memory separate from the host computer memory,
  - the set of node security keys are stored in the memory of the network interface device, and
  - the cryptographic unit encrypts data to be transferred between members of the virtual private group using the set of node security keys stored in the memory of the network interface device;
- wherein the policy management means includes means for determining, at each node, if another node is a member of the virtual private group;
- wherein the group communication means includes means for sending encrypted data between two or more nodes of the same virtual private group;
- wherein the packet filter blocks unauthorized packets as a function of a first set of security policy rules when the group communication means is sending or receiving data between members of the same virtual private group and as a function of a second set of security policy rules when the group communication means is sending or receiving data between members of different virtual private groups.

16. A computer-readable medium having computer-executable instructions thereon for performing a method, the method comprising:
- managing a plurality of group definitions on a policy server, each group definition including a plurality of group member entries;
- establishing a secure connection between the policy server and a plurality of group members, wherein:
  - each of the plurality of group members includes a host computer connected to a network interface device over a bus interface,
  - the host computer includes a memory, and
  - the network interface device includes a processor, a cryptographic unit, a packet filter, and a memory separate from the host computer memory;

creating a plurality of customized group member policies based on the group member entries in the group definitions;

securely sending a group membership key from the policy server to each of the group members;

securely sending a traffic encryption key list from the policy server to each of the group members and wherein the traffic encryption key list contains one or more traffic encryption keys;

securely sending the customized group member policies from the policy server to each of the corresponding group members; and storing the group membership key, traffic encryption key list and the customized group member policies in memory of the network interface device, wherein the customized group member policies include a first and a second set of group member policies applied by the packet filter of the network interface device to detect and block unauthorized packets, wherein the first set of group member policies are applied when sending or receiving data between group members.

17. The system of claim 16, wherein each security policy received by a virtual private group node includes a virtual private group table, wherein the virtual private group table includes virtual private group membership information for all the virtual private groups in which the group node is a member.

18. The system of claim 17, wherein each group node includes a means for accessing the virtual private group table with a group node identifier associated with a group node.

19. The system of claim 18, wherein the means for accessing includes a means for applying a priority to accesses within the virtual private table.

20. A method for securing communication within a virtual private group, the method comprising:

providing a policy server, wherein the policy server includes a security policy database, a filter rule database and a secure interface;

providing a plurality of nodes connected across a network, wherein each of the plurality of nodes includes a host computer connected to a network interface device over a bus interface, wherein the host computer includes a memory and wherein the network interface device includes a processor, a cryptographic unit, a packet filter to apply filter rules from the filter rule database, and a memory separate from the host computer memory, wherein the filter rule database includes a set of filter rules for each virtual private group;

assigning two or more nodes to a first virtual private group;

assigning two or more nodes to a second virtual private group;

determining group member data for each virtual private group;

establishing a secure connection between the policy server and the nodes of the first virtual private group and the nodes of the second virtual private group;

sending the virtual private group member data for the first virtual private group from the policy server to each member of the first virtual private group;

storing the virtual private group member data for the first virtual private group in the memory of the network interface device of each member of the first virtual private group;

sending the virtual private group member data for the second virtual private group from the policy server to each member of the second virtual private group;

storing the virtual private group member data for the second virtual private group in the memory of the network interface device of each member of the first virtual private group;

sending a secure communication between two or more members of the first virtual private group utilizing the first virtual private group's member data; and sending a second secure communication between two or more members of the second virtual private group utilizing the second virtual private group's member data.

21. The method of claim 20, wherein the virtual private group member data includes:

a shared membership key;

a list of shared traffic encryption keys, wherein the list includes one or more traffic encryption keys; and a virtual private group security policy.

22. The method of claim 21, wherein the security policy includes a list of each node assigned to a virtual private group.

23. The method of claim 21, wherein sending a secure communication includes encrypting a control message using the shared membership key.

24. The method of claim 21, wherein sending a secure communication includes encrypting a control message using the shared membership key, wherein the control message includes virtual private group member data.

25. The method of claim 21, wherein sending a secure communication includes encrypting a control message using the shared membership key, wherein the control message includes a pointer into the list of shared traffic encryption keys.

26. The method of claim 20, wherein the first virtual private group includes a first node and a second node, and wherein the second virtual private group includes the first node and a third node; and wherein the first and second nodes communicate using a first set of filter rules stored in the filter rule database and the first and third nodes communicate using a second set of filter rules stored in the filter rule database.

* * * * *

UNITED STATES PATENT AND TRADEMARK OFFICE
CERTIFICATE OF CORRECTION

PATENT NO. : 7,594,262 B2
APPLICATION NO. : 10/234223
DATED : September 22, 2009
INVENTOR(S) : Hanzlik et al.

It is certified that error appears in the above-identified patent and that said Letters Patent is hereby corrected as shown below:

On Page 2, under "Other Publications", in column 2, line 4, delete "Priviate" and insert -- Private --, therefor.

In column 1, line 9, delete "and;" and insert -- ; and --, therefor.

In column 5, line 33, delete "Adelman" and insert -- Adleman --, therefor.

In column 7, line 5, delete "maybe" and insert -- may be --, therefor.

In column 12, line 2, delete "of"VPG" and insert -- of "VPG --, therefor.

In column 12, line 3, delete "of"VPG" and insert -- of "VPG --, therefor.

In column 12, line 54, delete "sifting" and insert -- sitting --, therefor.

In column 13, line 19, delete "maybe" and insert -- may be --, therefor.

In column 13, line 51, in Claim 1, delete "the the" and insert -- the --, therefor.

In column 17, line 22, in Claim 17, delete "system" and insert -- computer-readable medium --, therefor.

In column 17, line 28, in Claim 18, delete "system" and insert -- computer-readable medium --, therefor.

In column 17, line 31, in Claim 19, delete "system" and insert -- computer-readable medium --, therefor.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,594,262 B2 Page 1 of 1
APPLICATION NO. : 10/234223
DATED : September 22, 2009
INVENTOR(S) : Hanzlik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Fourteenth Day of December, 2010

David J. Kappos
*Director of the United States Patent and Trademark Office*